Nov. 15, 1955 J. W. ONIONS 2,723,553
APPARATUS FOR TESTING SHOCK ABSORBERS
Filed March 3, 1953 2 Sheets-Sheet 1
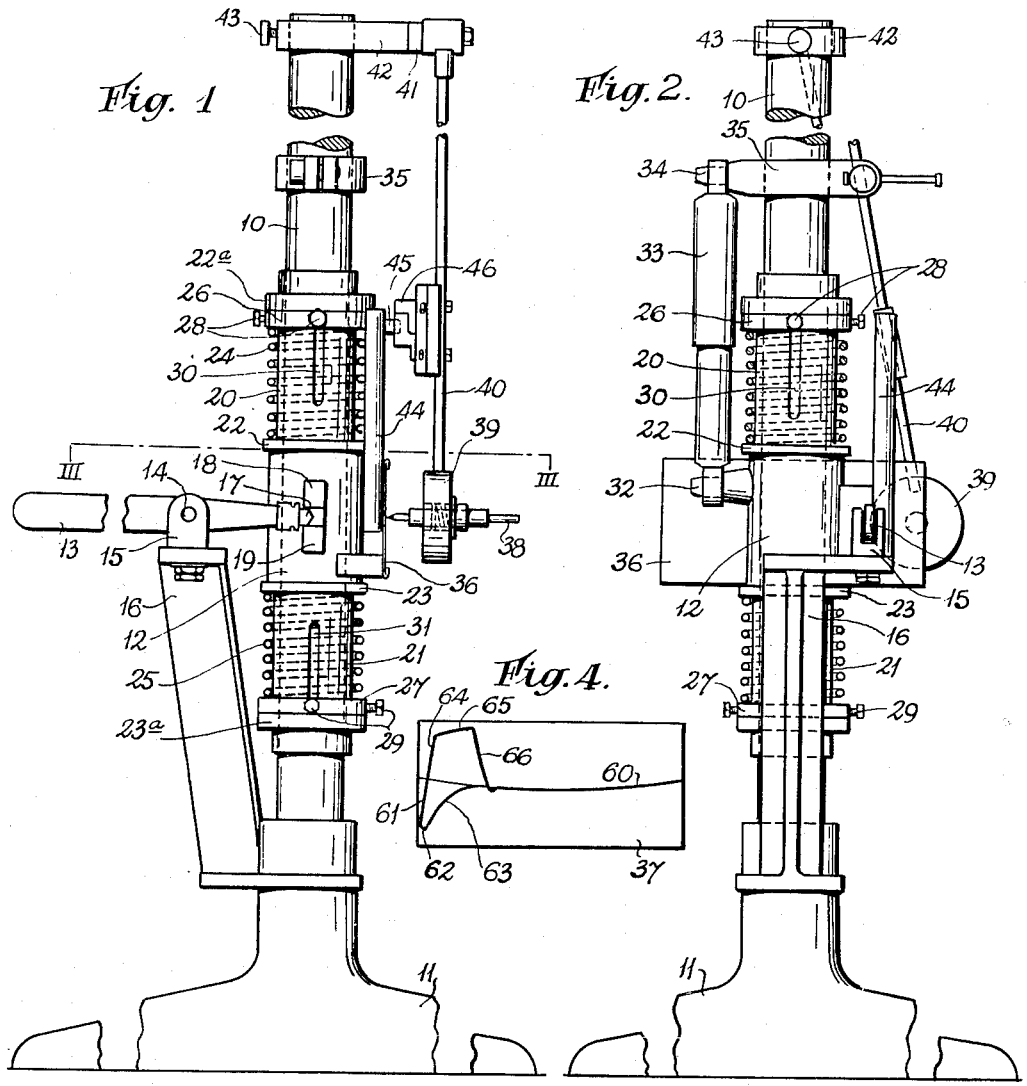
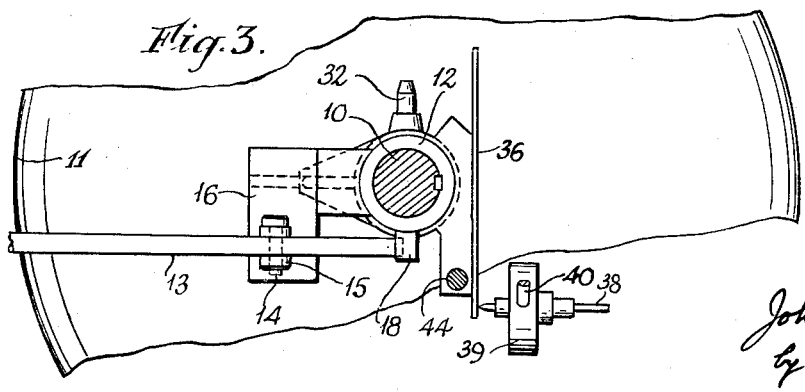

Nov. 15, 1955  J. W. ONIONS  2,723,553
APPARATUS FOR TESTING SHOCK ABSORBERS
Filed March 3, 1953  2 Sheets-Sheet 2
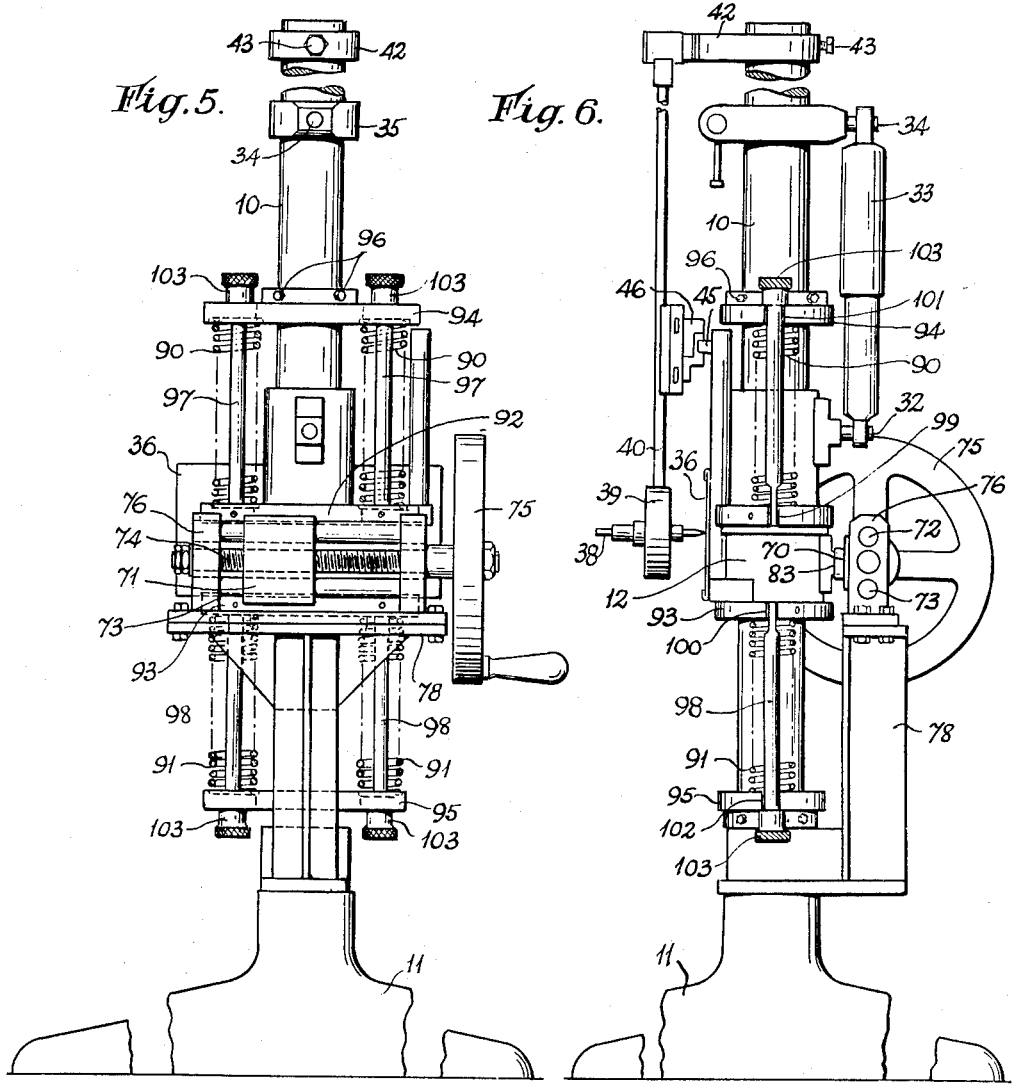
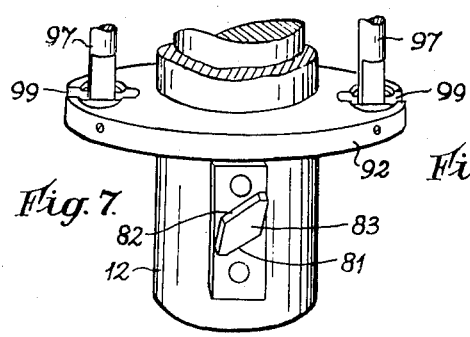
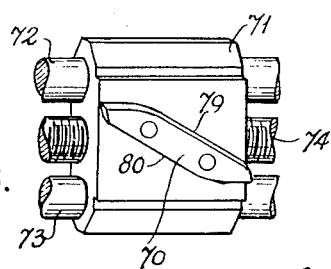

United States Patent Office 2,723,553
Patented Nov. 15, 1955

2,723,553

APPARATUS FOR TESTING SHOCK ABSORBERS

John Wilkinson Onions, Lincoln, England

Application March 3, 1953, Serial No. 340,035

6 Claims. (Cl. 73—11)

This invention relates to apparatus for testing shock absorbers and like vibration dampers.

Shock absorbing and like damping devices (hereinafter termed "shock absorbers") are used extensively today for the purpose of damping the movement of springs. For example they are to be found embodied in the sprung chassis of road vehicles of every description and in the landing gear of aircraft. Some are designed to damp the action of the spring in one direction only, usually the recoil, whilst others act in both directions. Some shock absorbers rely on friction to produce the damping effect whilst others are hydraulic. Whatever the system be on which they operate it is desirable to be able to test their efficiency and operation and one of the objects of the invention is to provide a simple and inexpensive apparatus which will enable a shock absorber to be tested.

According to this invention there is provided apparatus in which a shock absorber or like vibration damping device is tested by a method which comprises mounting a shock absorber for operative movement in one direction with the simultaneous compression, to a predetermined amount of load of spring means with which the shock absorber is associated, permitting recoil of the spring means to effect re-operative movement of the shock absorber in the reverse direction and causing said re-operative movement to be automatically recorded graphically as a function of time upon a chart movable in unison with the spring means.

Apparatus for carrying out the before described method according to this invention comprises fixed and movable shock absorber receiving mountings, spring means operatively associated with the movable one of said mountings, means operable for displacing said movable mounting to a position in which it imposes a predetermined load on said spring means simultaneously as it also operates in one direction a shock absorber, when positioned on the mountings, means for causing said displacing means suddenly to release the imposed load on the spring means to permit resulting recoil thereof to effect return movement of the movable mounting and consequential operation of the shock absorber in the reverse direction, and means for recording the movement of the shock absorber in said reverse direction as a known function of time.

The means for recording movement of the shock absorber under recoil of the spring means may comprise a chart holder carried by and movable in unison with the movable shock absorber receiving mounting, a pendulum adapted for swinging movement through a known arc in a known time across the front of the chart holder, means associated with and movable in unison with said movable mounting and adapted to co-operate with means on the pendulum so as to hold said pendulum poised during movement of said mounting for loading the spring means and to release the pendulum immediately prior to release of the load on the spring means, said pendulum carrying a scriber for operation upon the face of the chart holder on swinging movement of the pendulum.

The movable and fixed shock absorber receiving mountings may be carried on a column and the fixed mounting adapted to be adjustably positionable thereon.

The spring means may comprise a pair of upper and lower flanged sleeves each carrying a coil spring and each mounted on a column for slidable movement thereof one at each side of a load applying sleeve slidably mounted on the column, said load applying sleeve carrying and being adapted for operation so as to move the movable shock absorber receiving mounting and also being operable into load applying relation with either of the spring carrying sleeves.

The means for displacing the movable shock absorber receiving mounting may be actuated by a hand lever supported from the column and adapted for manipulable movement into and out of engagement therewith.

Alternatively, the means for displacing the movable shock absorber receiving mounting may be actuated by engagement and disengagement therewith of a rectilinear movable cam device associated with a hand wheel operated spindle mounted in bearings supported from the column.

Referring to the drawings filed herewith:

Fig. 1 is a front elevation of one form of apparatus made according to the present invention and adapted for testing hydraulic shock absorbers.

Fig. 2 is a side elevation of Fig. 1, and

Fig. 3 is a part sectional plan on line III—III of Fig. 1.

Fig. 4 shows a typical graph of the performance under test of a shock absorber.

Fig. 5 is a front elevation of a modified form of apparatus.

Fig. 6 is a side elevation of Fig. 5.

Figs. 7 and 8 are detail perspective views of parts of the apparatus of Fig. 5.

The apparatus shown in Figs. 1 to 3 comprises a vertical column 10 supported by a foot 11, which may be secured to the floor by bolts (not shown).

A sleeve 12 is mounted for vertical sliding movement on the column 10 under the influence of a lever 13 pivoted for movement in a vertical plane at 14, to a fulcrum 15 which is mounted on a supporting bracket 16 for swivelling movement in a horizontal plane, the operative end 17 of the lever being normally disposed between a pair of bosses 18, 19 on the sleeve 12 such that, on movement of the lever in a vertical plane, the sleeve is moved vertically upwardly or downwardly, as the case may be, along the column 10 until the operative end 17 of the lever disengages from one or other of the bosses 18, 19 by reason of its travel in an arcuate path about the pivot 14.

Two further sleeves 20, 21 are mounted on the column 10 one above and the other below the sleeve 12, each sleeve 20, 21 being provided with a flange 22, 23 engaging respectively the upper and lower end of the sleeve 12 and forming a seating for one end of a coiled spring 24, 25 surrounding the sleeve 20, 21 respectively, the other ends of the springs seating respectively against the collars 26, 27 secured by set screws 28, 29 to the column 10. The inner diameter of the collars 26, 27 is sufficiently greater than that of the column 10 to permit passage of the sleeve 20, 21 respectively between the collars 26, 27 and the column, said sleeves being provided with longitudinal slots 30, 31 to provide clearance for the set screws 28, 29 and with flanges 22a, 23a at the end remote from the flanges 22, 23.

The sleeve 12 is provided with a boss 32 forming a movable supporting mounting for one end of a shock absorber 33, the other end of the shock absorber being supported by a mounting 34 carried by an adjustably positionable fixed collar 35 secured to the column 10.

The sleeve 12 is also provided with a chart holder 36 adapted to support a chart 37 (Fig. 4) in a vertical plane and presented to a scriber 38 carried by the weighted end 39 of a pendulum 40 supported for swinging movement across the face of the chart 37 upon an arbour 41 carried by a collar 42 secured to the column 10 by one or more set screws 43.

Also mounted on the sleeve 12 adjacent one end of the chart holder 36 is a small pillar 44 having a laterally projecting fin 45 at its upper end, said fin being slidably engageable with a thin plate 46 carried by the pendulum 40 which normally holds the pendulum and scriber 38 inoperative and at rest at one end of the arc of movement of said pendulum so that on release of the pendulum as hereinafter described, said pendulum can swing with the scriber in contact with the chart.

The scriber 38 is resiliently mounted in the end 39 of the pendulum.

In use, a shock absorber 33 is mounted, as shown, on the mountings 32, 34 and the pendulum poised at one end of its arc of movement by interengagement of the fin 45 and plate 46. The lever 13 is then operated in a downward direction about its pivot 14 to cause the sleeve 12 to be displaced vertically up the column 10. The sleeve 12 in turn lifts the sleeve 20 and causes the spring 24 thereon to be compressed and thereby loaded between the flanges 22 and collar 26, and at the same time said sleeve applies a compressive force to the shock absorber. Meanwhile, the fin 45 of the pillar 44 carried by the sleeve 12 is moving upwardly relatively to and in slidable engagement with the plate 46 carried by the pendulum, and eventually disengages therefrom immediately before the operative end 17 of the lever 13 disengages from the boss 18 of the sleeve 12, whereupon the pendulum commences to swing across the chart 37.

Immediately after the pendulum commences to swing, the end 17 of the lever disengages from the boss 18 and the loaded spring 24 commences to recoil and forces the sleeves 20 and 12 in a downward direction and as the movable mounting 32 for the shock absorber is carried by the sleeve 12, an expansive force is applied to the shock absorber which resists recoil of the spring 24 and retards downward movement of the sleeve 12 and chart holder 36 and chart 37, so that a record of the resistance of the shock absorber to the applied expansive force is recorded graphically on the chart by the swinging scriber 38.

After recording such resistance of the shock absorber, the pendulum is reset as before and the free end of the lever 13 moved in an upward direction to cause the sleeves 12 and 21 to move downwardly over the column 10 and thereby load the spring 25 between the flange 23 of the sleeve 21 and the collar 27, the movement of the sleeve 12 causing an expansive force to be applied to the shock absorber. The flange 22a of the sleeve 20, by its engagement with the collar 26, holds the spring 24 and sleeve 20 against downward movement of the sleeve 12.

As before described, the pendulum is released, to commence its swing across the chart immediately before the lever disengages from the boss 19 of the sleeve 12.

When, however, the lever disengages from the boss 19, the loaded spring 25 commences to recoil and force the sleeves 21 and 12 in an upward direction and also, through the movable mounting 32, exert a compressive force upon the shock absorber which resists recoil of the spring 25 and retards upward movement of the sleeve 12 and chart holder 36 and chart 37 so that a resistance of the shock absorber to the applied compressive force is recorded by the scriber graphically upon the chart as before.

Fig. 4 shows a typical graphical record of the performance of a shock absorber under both expansive and compressive load.

The chart 37 is divided by an arcuate datum line 60 corresponding to the arc of movement of the scriber when the chart is at rest. The line 61 which is substantially normal to the datum line, shows the recorded mark made by the scriber on movement of the chart holder when the lever 13 is downwardly operated for applying a compressive force to the shock absorber during which time the pendulum remains poised. The line 62 indicates the continued marking by the scriber on release of the pendulum for the fraction of time the chart holder continues its movement until release of the spring 24 and the remaining line 63 which joins the datum line indicates the marking by the scriber on return movement of the chart holder as controlled by the resistance to expansive force of the shock absorber, said line 63 thereby recording said resistance to expansive force of the shock absorber as a function of time. The line 64, which is substantially normal to the datum line shows the recorded mark made by the scriber on movement of the chart holder when the lever 13 is upwardly operated for applying an expansive force to the shock absorber during which time the pendulum remains poised. The line 65 indicates the continued marking by the scriber on release of the pendulum for the fraction of time the chart holder continues its movement until release of the spring 25 and the remaining line 66 which joints the datum line indicates the marking by the scriber on return movement of the chart holder as controlled by the resistance to compressive force of the shock absorber, said line 66 thereby recording said resistance to compressive force of the shock absorber as a function of time.

In the modification shown in Figs. 5 to 8, the device is generally similar in operation to that described with reference to Figs. 1 to 3 except that vertical movement of the sleeve 12 is effected by means of a cam block 70 (Fig. 8) carried by a nut 71 mounted for horizontal to and fro movement, in a plane substantially tangential to the sleeve 12, upon guides 72, 73 by a screw spindle 74 operated by a hand wheel 75, the guides 72, 73 and the screw 74 being mounted in bearings 76, 77 carried by the bracket 78.

The cam block 70 is provided with two operative faces 79, 80 adapted respectively to engage one of two corresponding faces 81, 82 of a projection 83 (Fig. 7) carried on the sleeve 12, the arrangement being such that, considering Fig. 5, if the hand wheel 75 is operated to move the nut 71 to the left, the face 79 of the cam block 70 engages the face 81 of the projection 83 and causes the sleeve 12 to be raised up the column 10 until the cam block, in its continued travel to the left disengages from the projection 83 whereupon the springs 90 return the sleeve to the inoperative position. If, now, the nut 71 is moved back towards the right, the cam face 80 engages the face 82 of the projection 83 and causes the sleeve 12 to move down the column 10, until the cam block disengages from the projection, when the springs 91 return the slide 12 to the inoperative position.

Referring to Figs. 7 and 8, it will be appreciated that the sleeve 12 and associated parts shown in Fig. 7 are seen from the same viewpoint as the whole device of Fig. 5, whilst the nut 71 of Fig. 8 is viewed from a diametrically opposite point.

In the modification shown in Figs. 5 to 8, a different arrangement of springs from that of the apparatus of Figs. 1 to 3 has been provided. As shown, slides 92, 93 are disposed one above and one below the sleeve 12 with which they are maintained in contact by two pairs of coiled springs 90, 91 whose other ends seat against crossheads 94, 95 secured to the column 10 by set screws 96. The coiled springs 90, 91 are mounted on spaced pillars 97, 98 pivotally mounted in slots 99, 100 in the slides 92, 93, the free ends of the shafts 97, 98 being normally located in slots 101, 102 in the cross-heads, said free ends of the pillars being screw threaded to receive nuts 103 by which they are locked to the cross-heads, so that, when it is desired to substitute springs of greater loading capacity according to the power of the shock absorber to be tested, it is only necessary to slacken the nuts and swing the pillars and springs clear of the cross-head, whereupon the springs can be removed and other springs substituted.

Owing to the modified arrangement of the springs, the slides 92, 93 do not pass through the cross-heads 94, 95.

It will be appreciated that by providing the hand wheel operated mechanism a more even movement of the sleeve 12 and associated parts, and a more nearly constant time lapse between the release of the pendulum and the subsequent release of the springs and consequent application of load to the shock absorber is attained than with the lever-operated apparatus of Figs. 1 to 3.

The operation of the apparatus of Figs. 5 to 8 is substantially the same as that of Figs. 1 to 3 with the exception that it is effected by the rotation of the hand wheel and cam device instead of by movement of a hand lever.

What I claim and desire to secure by Letters Patent is:

1. Apparatus for testing shock absorbers and like vibration dampers comprising a fixed vertical column, a load-applying sleeve slidably mounted on said column, a shock absorber receiving mounting on said sleeve and movable therewith, a fixed shock absorber receiving mounting on said column above said sleeve, spring means on said column operatively connected with the movable mounting and, alternately, resiliently opposing and effecting movement of said sleeve, means for effecting sliding movement of said sleeve and hence movement of the movable mounting to a position in which it imposes a predetermined load on said spring means and simultaneously actuates in one direction a contractible and extendible shock absorber having its ends positioned on said mountings and for suddenly releasing said sleeve and the imposed load on the spring means to effect, under the action of the spring means, return movement of the sleeve and movable mounting and actuation of the shock absorber in the reverse direction and means responsive to the reverse actuation of the shock absorber for graphically recording the movement of the shock absorber in said reverse direction as a known function of time.

2. Apparatus for testing shock absorbers and like vibration dampers according to claim 1, wherein the means for recording movement of the shock absorber under recoil of the spring means comprises a chart holder carried by and movable in unison with the movable shock absorber receiving mounting, a pendulum mounted on said column and adapted for swinging movement through a known arc in a known time across the front of the chart holder, means connected with and movable in unison with said movable mounting and adapted to co-operate with means on the pendulum so as to hold said pendulum poised during movement of said mounting for loading the spring means and to release the pendulum immediately prior to release of the load on the spring means, said pendulum carrying a scriber for operation upon the face of the chart holder on swinging movement of the pendulum.

3. Apparatus for testing shock absorbers and like vibration dampers according to claim 1, wherein the spring means comprises a pair of upper and lower flanged sleeves each carrying a coil spring and each mounted on the column for slidable movement thereof one at each side of the load applying sleeve slidably mounted on the column, said load applying sleeve carrying and being adapted for operation so as to move the movable shock absorber receiving mounting and also being operable into load applying relation with either of the spring carrying sleeves.

4. Apparatus for testing shock absorbers and like vibration dampers according to claim 1, wherein the means for effecting movement of the load-applying sleeve and the movable shock absorber receiving mounting includes a hand lever supported from the column and arranged for manipulable movement into and out of engagement with said sleeve.

5. Apparatus for testing shock absorbers and like vibration dampers according to claim 1, wherein the means for effecting movement of the load-applying sleeve and the movable shock absorber receiving mounting includes a hand lever supported from the column and arranged for manipulable movement into and out of engagement with said sleeve, and a pair of spaced bosses on said sleeve between which one end of said hand lever is receivable and upon which it acts for effecting sleeve movements.

6. Apparatus for testing shock absorbers and like vibration dampers according to claim 1, wherein the means for effecting movement of the load-applying sleeve and the movable shock absorber receiving mounting includes a cam block mounted for horizontal movement tangentially of said sleeve, cooperating cam faces on said cam block and sleeve and hand wheel means for moving the cam block to and fro.

References Cited in the file of this patent

UNITED STATES PATENTS

| | | |
|---|---|---|
| 1,255,919 | O'Conner | Feb. 12, 1918 |
| 1,604,141 | Amsler | Oct. 26, 1926 |
| 1,694,005 | Elsey | Dec. 4, 1928 |
| 2,124,547 | De Port | July 26, 1938 |
| 2,686,423 | Thompson | Aug. 17, 1954 |